United States Patent
Park (10) Patent No.: US 10,899,378 B2
(45) Date of Patent: Jan. 26, 2021

(54) STEERING COLUMN DEVICE WORKING TOGETHER WITH AIRBAG SYSTEM

(71) Applicants: Hyundai Motor Company, Seoul (KR); Kia Motors Corporation, Seoul (KR)

(72) Inventor: Jung Woo Park, Seoul (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 89 days.

(21) Appl. No.: 16/361,698

(22) Filed: Mar. 22, 2019

(65) Prior Publication Data

US 2020/0148250 A1    May 14, 2020

(30) Foreign Application Priority Data

Nov. 9, 2018  (KR) .................... 10-2018-0137499

(51) Int. Cl.
  *B62D 1/18* (2006.01)
  *B62D 1/19* (2006.01)
  *B60R 21/203* (2006.01)
  *B62D 1/181* (2006.01)

(52) U.S. Cl.
  CPC ............ *B62D 1/181* (2013.01); *B60R 21/203* (2013.01); *B62D 1/197* (2013.01)

(58) Field of Classification Search
  CPC ...... B60R 21/203; B62D 1/183; B62D 1/197; B62D 1/18
  See application file for complete search history.

(56) References Cited

U.S. PATENT DOCUMENTS

| | | | | |
|---|---|---|---|---|
| 5,295,712 A | * | 3/1994 | Omura | B60R 21/203 280/731 |
| 5,507,521 A | * | 4/1996 | Steffens, Jr. | B60R 21/203 180/282 |
| 6,227,571 B1 | * | 5/2001 | Sheng | B62D 1/197 280/731 |

(Continued)

FOREIGN PATENT DOCUMENTS

| | | | |
|---|---|---|---|
| DE | 10261178 B3 * | 6/2004 | ............ B62D 1/181 |
| DE | 10 2017 204 085 A1 | 9/2018 | |

(Continued)

OTHER PUBLICATIONS

Machine Language Translation of DE 102017204085 A1 obtained from google.com/patents of Aug. 7, 2020.*

(Continued)

*Primary Examiner* — Ruth Ilan
(74) *Attorney, Agent, or Firm* — Morgan, Lewis & Bockius LLP (57) ABSTRACT

A steering column apparatus may include a moveable unit assembled with the steering wheel at a front end portion thereof to be driven back and forth; a guide unit mounted to a rear end portion of the moveable unit to guide back and forth movement of the moveable unit; a drive unit provided in the guide unit to drive the moveable unit; and an actuator unit configured to fix the drive unit to the guide unit, and provided with an inflator triggered in cooperation with an operation signal of the airbag, to be operated to generate a propulsive force in a forward direction thereof.

9 Claims, 5 Drawing Sheets

(56) References Cited

U.S. PATENT DOCUMENTS

| | | | | |
|---|---|---|---|---|
| 7,080,855 B2* | 7/2006 | Muller | ............... | B60R 21/203 |
| | | | | 280/777 |
| 7,204,511 B2* | 4/2007 | Mori | ............... | B60R 21/203 |
| | | | | 280/731 |
| 7,314,234 B2* | 1/2008 | Muller | ............... | B60R 21/2032 |
| | | | | 280/777 |
| 7,862,079 B2* | 1/2011 | Fukawatase | ............... | B60R 21/2032 |
| | | | | 280/731 |
| 9,452,725 B2* | 9/2016 | Lorenz | ............... | B62D 1/16 |
| 9,550,514 B2* | 1/2017 | Schulz | ............... | B60R 21/2338 |
| 9,919,724 B2* | 3/2018 | Lubischer | ............... | B62D 1/181 |
| 9,994,178 B2* | 6/2018 | Paxton | ............... | B60R 21/203 |
| 2002/0089160 A1* | 7/2002 | Mendis | ............... | B62D 1/181 |
| | | | | 280/777 |
| 2004/0012186 A1* | 1/2004 | Andersson | ............... | B62D 1/181 |
| | | | | 280/777 |
| 2007/0241548 A1* | 10/2007 | Fong | ............... | B60R 21/09 |
| | | | | 280/777 |
| 2016/0121918 A1 | 5/2016 | Soderlind | | |
| 2018/0057039 A1* | 3/2018 | Gapinski | ............... | B62D 1/19 |
| 2018/0134308 A1 | 5/2018 | Derocher et al. | | |

FOREIGN PATENT DOCUMENTS

| | | |
|---|---|---|
| KR | 10-0558858 B1 | 3/2006 |
| KR | 10-2007-0017663 A | 2/2007 |
| KR | 10-0878629 B1 | 1/2009 |

OTHER PUBLICATIONS

European search report dated Oct. 2, 2019 for European Patent Application No. 19163418.7.

* cited by examiner

STEERING COLUMN DEVICE WORKING TOGETHER WITH AIRBAG SYSTEM

CROSS REFERENCE TO RELATED APPLICATION

The present application claims priority to Korean Patent Application No. 10-2018-0137499, filed Nov. 9, 2018, the entire contents of which is incorporated herein for all purposes by this reference.

BACKGROUND OF THE INVENTION

Field of the Invention

The present invention relates generally to a steering column apparatus working together with an airbag system. More particularly, the present invention relates to a steering column apparatus working together with an airbag system, the steering column apparatus being capable of protecting a driver by reducing a distance between a steering wheel and the driver in cooperation with operation of an airbag.

Description of Related Art

Generally, a steering apparatus of a vehicle, which is a device for arbitrarily changing the traveling direction of the vehicle, may include: an operating mechanism including a steering wheel that a driver manipulates directly, a steering shaft rotated by being coupled to the steering wheel, and a steering column to which a tilting means and a telescopic means are mounted to the steering shaft for additional facilities necessary for the operation; a gear mechanism; a link mechanism; and the like. Herein, the tilting means is for adjusting the steering wheel in the vertical direction thereof, and the telescopic means is for adjusting the steering wheel in the forward and backward directions. Thus, the driver adjusts the tilting and telescopic means appropriately so that the steering wheel may be operated in an optimum posture.

Recently, an airbag is disposed in the steering wheel to minimize the risk of injury to the driver by preventing the driver from directly colliding with the steering wheel during a frontal vehicle collision.

Meanwhile, as the development of autonomous vehicles becomes more active, the telescopic volume is expected to be increases to secure a wide internal space for the driver. For example, in the autonomous mode, the driver does not need to manipulate the steering wheel, so a large amount of telescopic function may be applied to push the steering wheel toward the crash pad, to secure a wide internal space.

However, when a collision occurs in the state where the steering wheel is fully telescopically contracted by executing the autonomous mode, the distance between the steering wheel and the driver is too far to adequately protect the driver although the airbag provided in the steering wheel is deployed.

The information disclosed in this Background of the Invention section is only for enhancement of understanding of the general background of the invention and may not be taken as an acknowledgement or any form of suggestion that this information forms the prior art already known to a person skilled in the art.

BRIEF SUMMARY

Various aspects of the present invention are directed to providing a steering column apparatus working together with an airbag system, the steering column apparatus configured for sufficiently protecting a driver by reducing a distance between a steering wheel and the driver in cooperation with operation of an airbag.

In various aspects of the present invention, there is provided a steering column apparatus working together with an airbag system, in which the steering column apparatus is assembled with a steering wheel having an airbag and is driven telescopically, the device including: a moveable unit assembled with the steering wheel at a front end portion of the moveable unit to be driven back and forth; a guide unit mounted to a rear end portion of the moveable unit to guide back and forth a movement of the moveable unit; a drive unit provided in the guide unit to drive the moveable unit; and an actuator unit configured to fix the drive unit to the guide unit, and provided with an inflator triggered in cooperation with an operation signal of the airbag, to be operated to generate a propulsive force in a forward direction and to integrally drive the moveable unit along with the drive unit in the forward direction while releasing a fixed state of the drive unit and the guide unit.

The moveable unit may include a moveable main body configured such that a front end portion thereof is formed with an assembly area to which the steering wheel is assembled, and a rear end portion thereof is formed with a connection area guided by the guide unit while being fixed to the drive unit.

The guide unit may include: a guide rod inserted through the rear end portion of the moveable unit to guide back and forth movement of the moveable unit; and a guide cover configured to cover the guide rod with being spaced from an external circumferential surface of the guide rod by a predetermined gap, and to guide back and forth movement of the moveable unit.

The guide cover may be formed with a first guide slot for guiding movement of the drive unit, and a second guide slot for guiding movement of the actuator unit.

The drive unit may include a drive main body mounted to the guide unit by the actuator unit, a bracket provided in the drive main body such that the inflator is mounted thereto, and a slide rod configured to be guided by being inserted from the drive main body into the second guide slot of the guide unit; and the actuator unit may include the inflator, a fixing plate configured to fix the slide rod to a predetermined position of the second guide slot, and at least a pin configured to fix the fixing plate to the guide cover, wherein the at least a pin is broken by an explosion reaction force generated by operation of the inflator to release a fixed state between the fixing plate and the guide cover.

The at least a pin may be made of plastic material.

The drive unit may further include: a screw provided extending from the drive main body in a direction parallel to the movement of the moveable unit; and a motor provided to be driven back and forth along the screw, and configured to be guided by the first guide slot and be connected to the moveable unit, integrally driving the moveable unit back and forth.

The steering column apparatus may further include a control unit 500 configured to operate the actuator unit in cooperation with the operation signal of the airbag.

According to an exemplary embodiment of the present invention, it is advantageous in that since the distance between the steering wheel and the driver is reduced rapidly by the inflator operating in cooperation with the operation signal of the airbag, it is possible to maximally protect the driver by the airbag when the airbag provided in the steering wheel is deployed.

Even if a collision occurs in the state where the steering wheel is fully telescopically contracted in the autonomous mode, in conjunction with the deployment signal of the airbag, the distance between the steering wheel and the driver may be reduced rapidly, thus maximally ensuring the protection of the driver in the autonomous mode.

The methods and apparatuses of the present invention have other features and advantages which will be apparent from or are set forth in more detail in the accompanying drawings, which are incorporated herein, and the following Detailed Description, which together serve to explain certain principles of the present invention.

It may be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particularly intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the other hand, the invention(s) is/are intended to cover not only the exemplary embodiments, but also various alternatives, modifications, equivalents and other embodiments, which may be included within the spirit and scope of the invention as defined by the appended claims.

Figure 1:
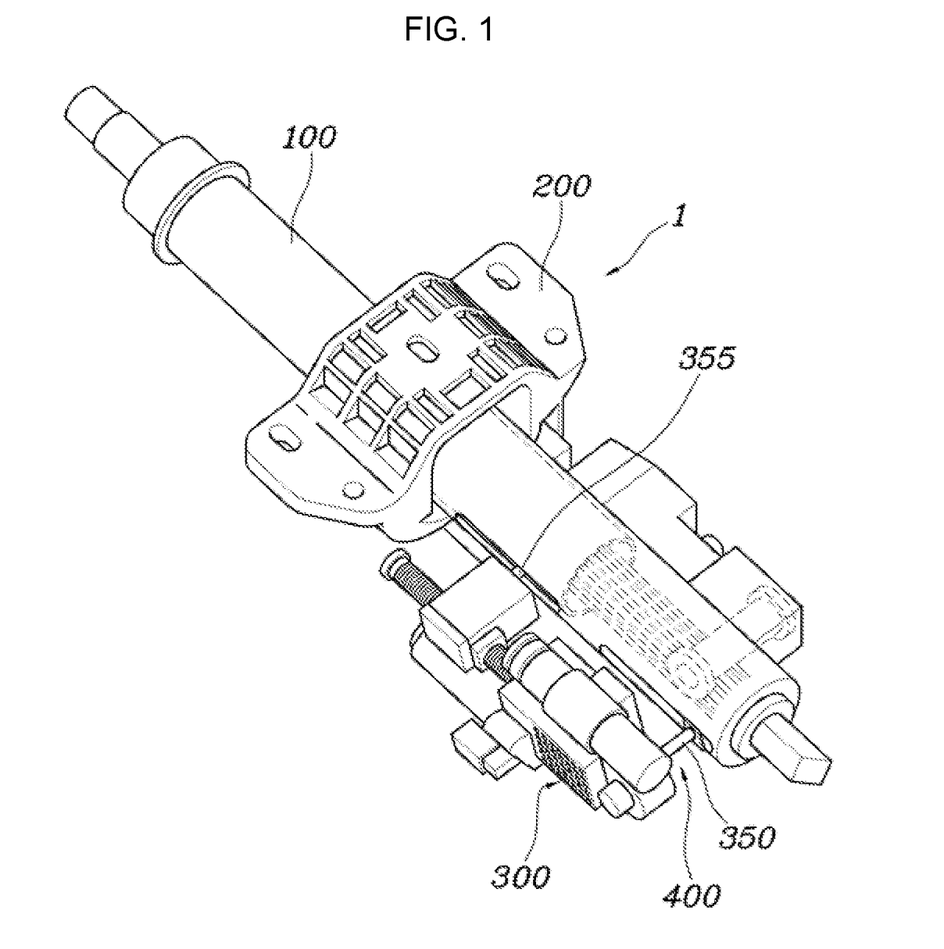
FIG. 1 and FIG. 2 are views showing a steering column apparatus working together with an airbag system according to an exemplary embodiment of the present invention.
Figure 2:
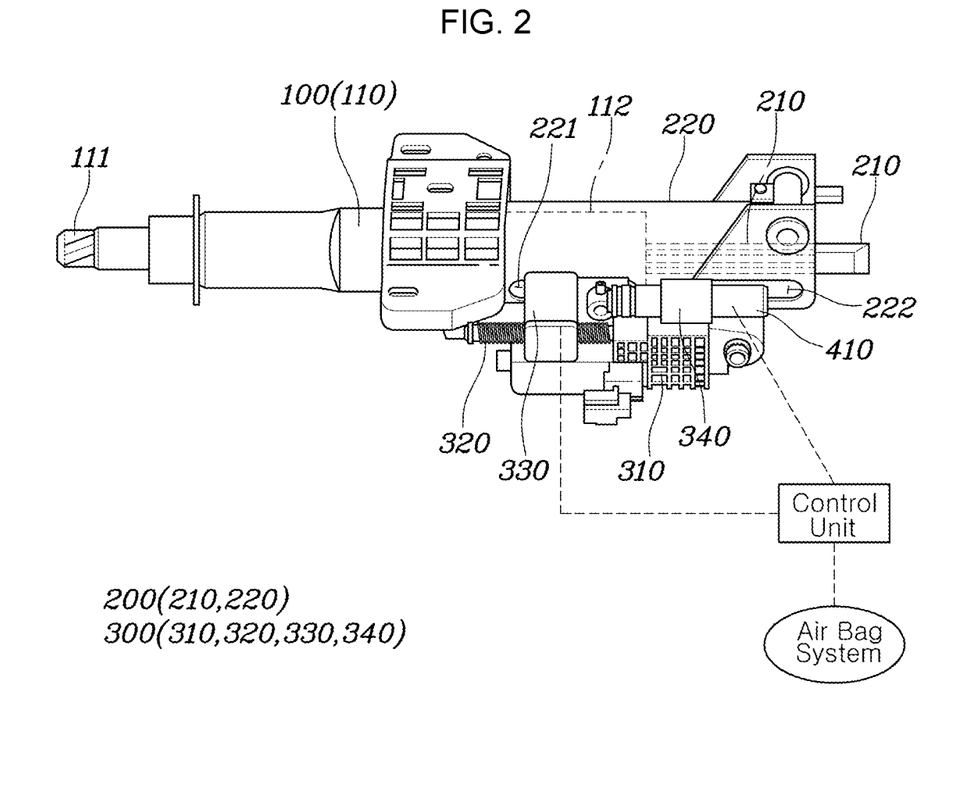
Figure 3:
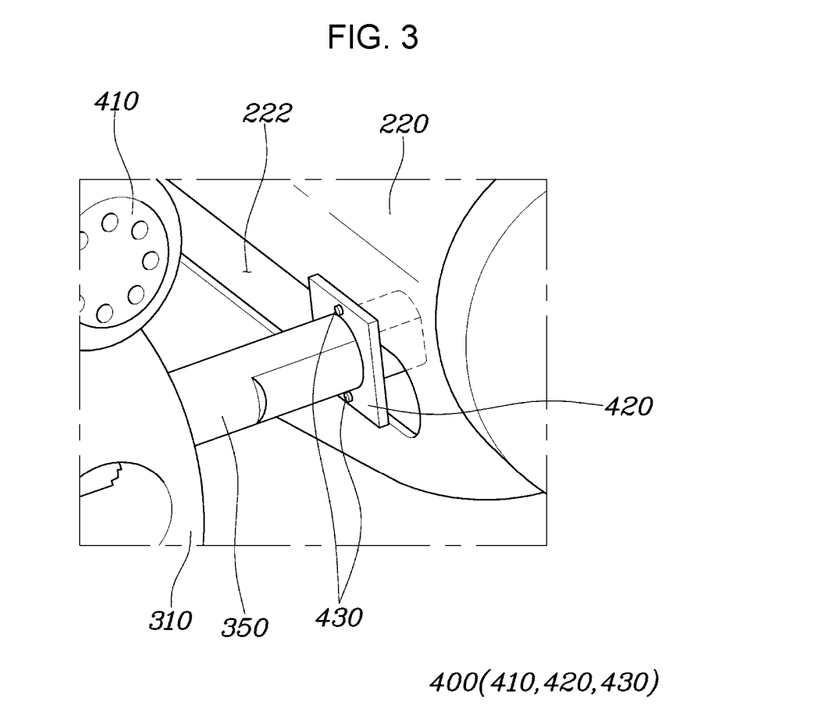
FIG. 3 is a view showing an important portion of the steering column apparatus working together with an airbag system according to the exemplary embodiment of the present invention.

FIG. 1 and FIG. 2 are views showing a steering column apparatus working together with an airbag system according to an exemplary embodiment of the present invention; and FIG. 3 is a view showing an important portion of the steering column apparatus working together with an airbag system according to the exemplary embodiment of the present invention.

As shown in the drawings, a steering column apparatus 1 working together with an airbag system according to an exemplary embodiment of the present invention, in which the steering column apparatus is assembled with a steering wheel W having an airbag A and is driven telescopically, roughly includes: a moveable unit 100 assembled with the steering wheel W at a front end portion thereof to be driven back and forth; a guide unit 200 mounted to a rear end portion of the moveable unit 100 to guide back and forth a movement of the moveable unit 100; a drive unit 300 provided in the guide unit 200 to drive the moveable unit 100; and an actuator unit 400 provided with an inflator 410 triggered in cooperation with an operation signal of the airbag A, to integrally drive the moveable unit 100 along with the drive unit 300 in a forward direction while being operated to generate a propulsive force in the forward direction thereof. The steering column apparatus further includes a control unit 500 configured to operate the actuator unit 400 in cooperation with the operation signal of the airbag A.

The moveable unit 100 and the guide unit 200 are units provided such that the steering column apparatus 1 is driven telescopically, wherein as the moveable unit 100 is driven in the forward and backward directions in the guide unit 200, the position of the steering wheel W is changed in the forward and backward direction thereof. Here, the forward and backward directions refer to an axial directions of the moveable unit 100 and the guide unit 200, wherein the forward direction means the direction in which the steering wheel W assembled in the moveable unit 100 moves in the direction of approaching a driver and the backward direction means the direction in which the steering wheel W moves in the direction away from the driver.

The moveable unit 100 includes a moveable main body 110 configured such that a front end portion thereof is formed with an assembly area 111 to which the steering wheel W is assembled, and a rear end portion thereof is formed with a connection area 112 guided by the guide unit 200 while being fixed to the drive unit 300. Here, the moveable main body 110 may be a steering shaft provided in a general steering system of a vehicle.

The guide unit 200 includes: a guide rod 210 inserted through the moveable unit 100, preferably, through the rear end portion of the moveable main body 110 to guide the back and forth movement of the moveable main body 110; and a guide cover 220 configured to cover the guide rod 210 with being spaced from an external circumferential surface of the guide rod 210 by a predetermined gap, and to guide the back and forth movement of the guide rod 210.

Thus, the moveable main body 110 is disposed between the guide rod 210 and the guide cover 220, and slides along the external circumferential surface of the guide rod 210 and the internal surface of the guide cover 220 in the space defined by the guide rod 210 and the guide cover 220, to be operated in the forward and backward directions.

Here, the side surface of the guide cover 220 is formed with a first guide slot 221 for guiding movement of the drive unit 300, and a second guide slot 222 for guiding movement of the actuator unit 400. The first guide slot 221 and the second guide slot 222 are formed spaced from each other on the same straight line. Of course, the first guide slot 221 and the second guide slot 222 may be formed to communicate with each other.

Meanwhile, since the distance by which the movable main body 110 is driven is set according to the length of the first guide slot 221 and the second guide slot 222, the first guide slot 221 and the second guide slot 222 are preferably formed to have a sufficient length so that the movable main body may be sufficiently driven. For example, since conventionally, the steering wheel W is driven is from a distance of 25 mm, but the distance may be set to 150 mm or more in a vehicle to which the autonomous mode is applied, the length of the first guide slot 221 and the length of the second guide slot 222 is preferably set to 150 mm or more.

The drive unit 300, which is for providing a driving force to drive the moveable unit 100 back and forth, includes: a drive main body 310 mounted to the guide unit 200; a screw 320 provided extending from the front end portion of the drive main body 310 in a direction parallel to a drive direction of the moveable main body 110; and a motor 330 provided to be driven back and forth along the screw 320.

Here, the screw 320 is preferably provided parallel to the first guide slot 221.

Furthermore, a portion of the motor 330 is connected to the moveable main body 110 through the first guide slot 221, and is driven back and forth along the screw 320, integrally driving the moveable unit 100 back and forth.

In an exemplary embodiment of the present invention, the portion of the motor 330 may be a connection rod 355.

Meanwhile, the drive unit 300 is further provided with components for connection to the actuator unit 400 which is operated rapidly according to a deployment signal of the airbag A.

For example, the rear end portion of the drive main body 310 is provided with a bracket 340 in which the actuator unit 400 is disposed, and a slide rod 350 inserted through the second guide slot 222 and guided thereby.

The actuator unit 400, which is a unit configured to fix the drive main body 310 of the drive unit 300 to the external surface of the guide cover 220 of the guide unit 200 and to be triggered in cooperation with an operation signal of the airbag A to integrally drive the moveable main body 110 along with the drive main body 310 while releasing a fixed state of the drive unit 300 and the guide unit 200, includes: the inflator 410 as a means for rapidly driving the drive main body 310; and a fixing plate 420 and at least a pin 430 for fixing the slide rod 350 provided in the drive main body 310 to the external surface of the guide cover 220.

The inflator 410 is disposed in the bracket 340 provided in the drive main body 310, and generates a propulsive force in the forward direction by being triggered in cooperation with the operation signal of the airbag A. Here, the propulsive force is the force generated by the explosive force, i.e., the explosion reaction force generated when the gas filled in the inflator explodes, and the direction of the propulsive force is preferably set in a direction in which the drive main body 310 and the moveable main body 110 are moved so that the steering wheel W approaches the driver. In other words, in the exemplary embodiment of the present invention, the direction of the propulsive force is generated to the rear.

In an exemplary embodiment of the present invention, an end of the inflator 410 is connected to a stationary member such as a vehicle body and another end of the inflator 410 is connected to the bracket 340 such that when the explosion reaction force is generated when the gas filled in the inflator explodes, the propulsive force moves the drive main body 310 and the moveable main body 110 in a direction in which the steering wheel W approaches the driver.

The fixing plate 420 is for fixing the slide rod 350 to a predetermined position of the second guide slot 222, and is configured to be fixed to the predetermined position of the second guide slot 222 such that the slide rod 350 is fixed to the predetermined position therethrough.

The at least a pin 430 is for fixing the fixing plate 420 to the guide cover 220, and is provided to integrally penetrate through the fixing plate 420 and the guide cover 220 to fix the fixing plate 420 to the guide cover, usually. However, if a propulsive force is generated due to the occurrence of a collision and the inflator 410 is operated, the at least a pin is broken by the propulsive force and releases a fixed state between the fixing plate 420 and the guide cover 220. To achieve this, the at least a pin 430 usually maintains a rigidity to fix the fixing plate 420 to the guide cover 220, but has rigidity to be broken by a propulsive force generated in the inflator 410. Thus, the at least a pin 430 is preferably manufactured by injection molding a plastic material.

The control unit 500 usually is configured to provide the motor 330 with an operation signal for the motor 330 of the drive unit 300 generated by operation by the driver. Furthermore, when a collision signal of the vehicle is detected by various detection means provided in the vehicle, the control unit 500 provides the collision signal to the airbag A to deploy the airbag A. In the exemplary embodiment of the present invention, the control unit 500 provides a signal to the inflator 410 to operate the inflator 410 in conjunction with the signal for deploying the airbag A. The control unit 500 may be provided separately, but it may be set by adding such a function to an electronic control unit 500 (ECU) provided in the vehicle.

The operation state of the steering column apparatus working together with an airbag system according to the exemplary embodiment of the present invention configured as described above will be described with reference to the accompanying drawings.

Figure 4:
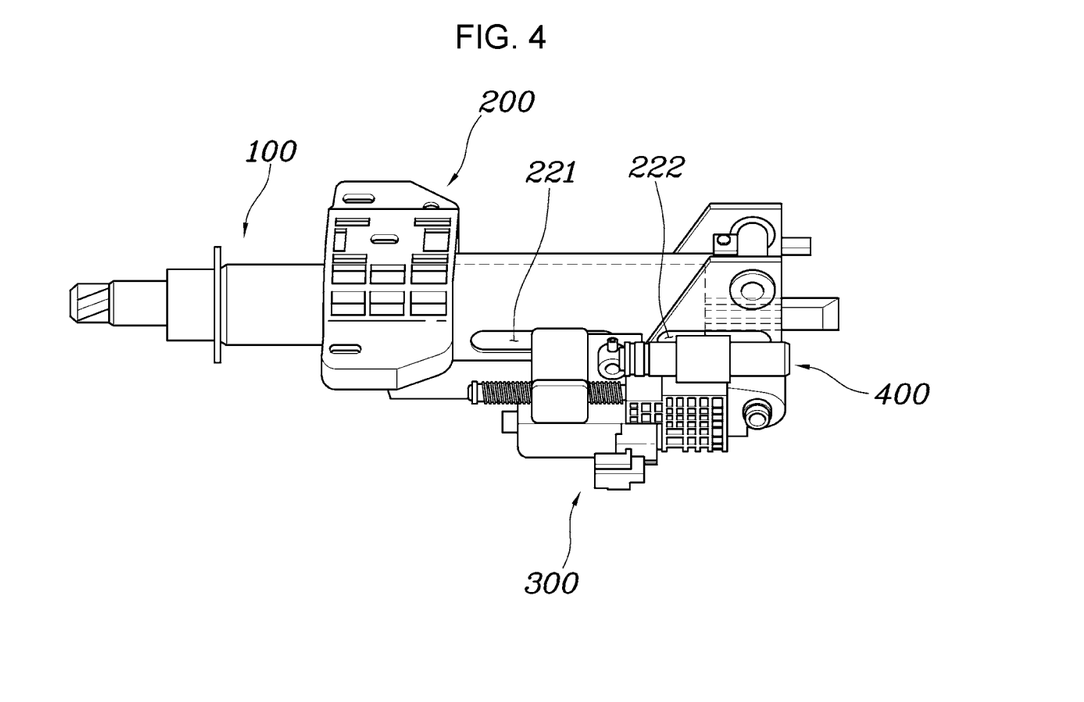
FIG. 4 is a view showing the state before operation of the steering column apparatus working together with an airbag system according to the exemplary embodiment of the present invention.
Figure 5:
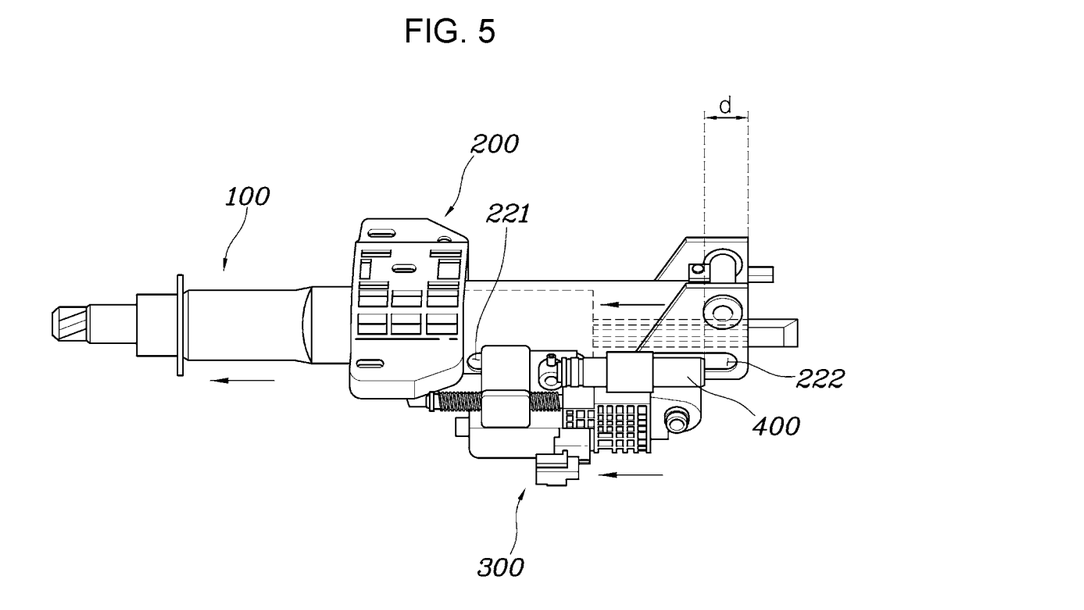
FIG. 5 is a view showing the state after operation of the steering column apparatus working together with an airbag system according to the exemplary embodiment of the present invention.
Figure 6:
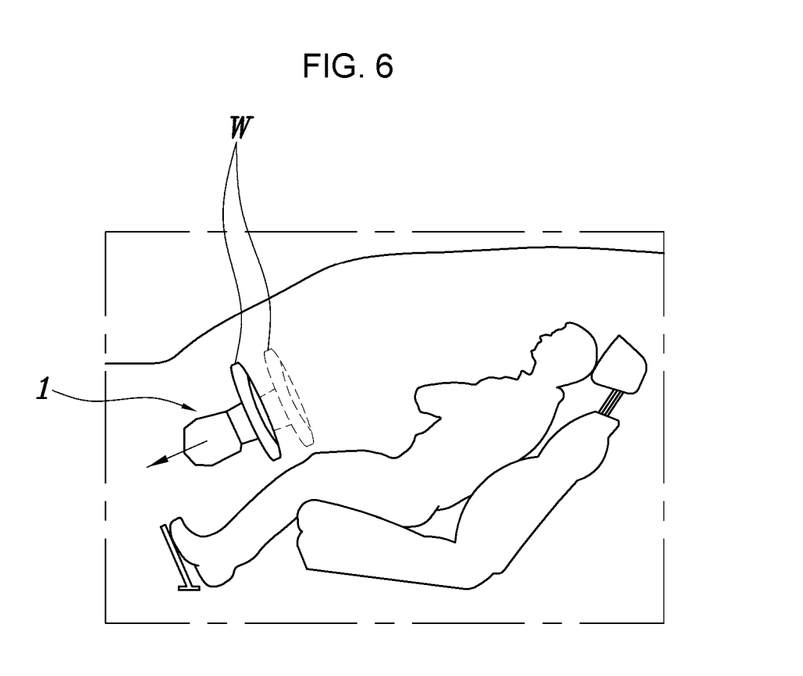
FIG. 6, FIG. 7, and FIG. 8 are views showing the operation state of the steering column apparatus working together with an airbag system according to the exemplary embodiment of the present invention.
Figure 7:
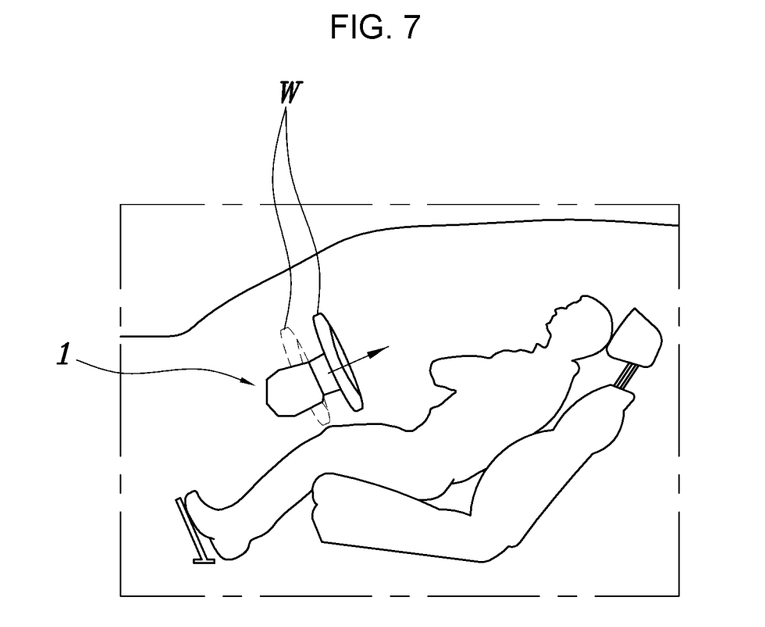
Figure 8:
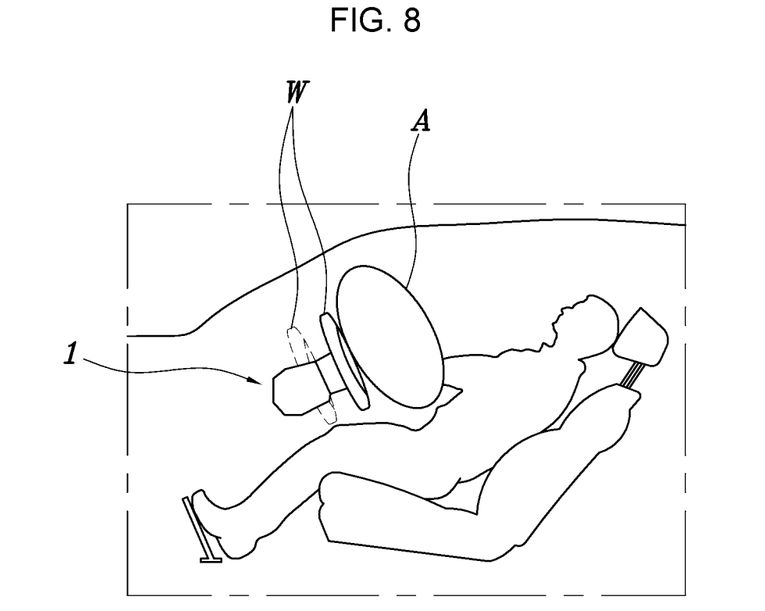

FIG. 4 is a view showing the state before operation of the steering column apparatus working together with an airbag system according to the exemplary embodiment of the present invention; FIG. 5 is a view showing the state after operation of the steering column apparatus working together with an airbag system according to the exemplary embodiment of the present invention; and FIG. 6, FIG. 7, and FIG. 8 are views showing the operation state of the steering column apparatus working together with an airbag system according to the exemplary embodiment of the present invention.

Usually, as shown in FIG. 4, the state where the drive unit 300 is fixed to the guide unit 200 is maintained. Thus, when the back and forth driving of the moveable unit 100 is required, the moveable unit is driven in the forward and backward directions along the screw 320 by operating the motor 330, so that the position of the steering wheel W assembled to the assembly area 111 of the moveable main body 110 may be adjusted. For example, in the autonomous mode, to secure a sufficient space for the driver, as shown in FIG. 6, the moveable unit 100 is moved in the fully telescopically contracted state.

When a collision signal is detected in the instant state, a signal for deploying the airbag A is transmitted from the control unit 500, and a signal for operating the inflator 410 in conjunction with the signal for deploying the airbag is provided to the inflator 410. As such, as shown in FIGS. 5 and 7, the inflator 410 is operated and the propulsive force is generated, whereby the at least a pin 430 is broken and the fixed state between the drive main body 310 and the guide cover 220 is released, and the moveable main body 110 integrally with the drive main body 310 is moved forward thereof. As a result, the steering wheel W assembled to the assembly area 111 of the moveable main body 110 is moved toward the direction of approaching the driver, and the gap between the steering wheel W and the driver is reduced.

Here, the moving distance d of the moveable main body 110 is determined by the length of the second guide slot 222. The slide rod 350 inserted into the second guide slot 222 is interrupted at the front side end portion of the second guide slot 222 to determine the maximum point of the movement.

When the moveable main body 110 integrally with the drive main body 310 is moved forward, the airbag A is simultaneously deployed as shown in FIG. 8 so that the driver may be sufficiently protected by the airbag A.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "internal", "external", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A steering column apparatus working in combination with an airbag system, in which the steering column apparatus is assembled with a steering wheel having an airbag and is driven telescopically, the steering column apparatus comprising:
    a moveable unit assembled with the steering wheel at a front end portion of the moveable unit to be driven back and forth;
    a guide unit mounted to a portion of the moveable unit to guide back and forth a movement of the moveable unit;
    a drive unit fixed to the guide unit to drive the moveable unit; and
    an actuator unit fixing the drive unit to the guide unit, and provided with an inflator configured to be triggered in cooperation with an operation signal of the airbag,
    wherein the inflator is configured to generate a propulsive force and to integrally drive the moveable unit and the drive unit in a forward direction of the moveable unit while releasing a fixed state of the drive unit and the guide unit when the inflator generates the propulsive force,
    wherein the guide unit includes:
        a guide rod inserted through a rear end portion of the moveable unit to guide back and forth movement of the moveable unit; and
        a guide cover covering the guide rod with being spaced from an external circumferential surface of the guide rod by a gap, and guiding the back and forth movement of the moveable unit, and
    wherein the guide cover includes:
        a first guide slot in which a portion of the drive unit is engaged for guiding movement of the drive unit; and
        a second guide slot in which a portion of the actuator unit is engaged for guiding movement of the actuator unit.

2. The apparatus of claim 1, wherein the moveable unit includes:
    a moveable main body having:
        a front end portion formed with an assembly area to which the steering wheel is configured to be assembled; and
        a rear end portion formed with a connection area fixed to the drive unit and guided by the guide unit.

3. The apparatus of claim 2, wherein the drive unit includes a motor and the motor is connected to the moveable main body through the first guide slot by a connection rod connecting the motor and the moveable main body through the first guide slot.

4. The apparatus of claim 1, wherein the first guide slot and the second guide slot are aligned in series along a longitudinal direction of the guide rod.

5. The apparatus of claim 1,
    wherein the drive unit includes:
        a drive main body mounted to the guide unit by the actuator unit;
        a bracket provided in the drive main body wherein the inflator is mounted to the bracket; and
        a slide rod wherein a first end of the slide rod is coupled to the drive main body and a second end of the slide rod is coupled to the second guide slot and selectively guided along the second guide slot of the guide unit by operation of the actuator unit.

6. The apparatus of claim 5, wherein the actuator unit includes:
    the inflator;
    a fixing plate fixing the second end of the slide rod to the guide cover in a predetermined position of the second guide slot; and
    at least a pin fixing the fixing plate to the guide cover,
    wherein the at least a pin is broken by an explosion reaction force generated by operation of the inflator to release a fixed state between the fixing plate and the guide cover.

7. The apparatus of claim 6, wherein the at least a pin is made of plastic material.

8. The apparatus of claim 6, wherein the drive unit further includes:
    a screw provided extending from the drive main body in a direction parallel to the movement of the moveable unit; and
    a motor provided to be driven back and forth along the screw, and configured to be guided by the first guide slot to which a connection rod is mounted to connect the motor and the moveable unit, driving the moveable unit back and forth.

9. The apparatus of claim 1, further including:
    a control unit configured to operate the inflator in cooperation with the operation signal of the airbag.

* * * * *